(12) United States Patent
Shi et al.

(10) Patent No.: US 9,060,338 B2
(45) Date of Patent: Jun. 16, 2015

(54) METHOD AND APPARATUS FOR SWITCHING BETWEEN LOW-POWER, SINGLE-CHAIN LISTEN AND MULTIPLE-CHAIN DEMODULATION

(71) Applicant: QUALCOMM Incorporated, San Diego, CA (US)

(72) Inventors: Kai Shi, San Jose, CA (US); Paul Husted, San Jose, CA (US); Ning Zhang, Saratoga, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/831,238

(22) Filed: Mar. 14, 2013

(65) Prior Publication Data

US 2014/0269995 A1 Sep. 18, 2014

(51) Int. Cl.
*H04L 1/02* (2006.01)
*H04W 52/02* (2009.01)
*H04L 25/06* (2006.01)
*H04B 7/08* (2006.01)

(52) U.S. Cl.
CPC ........... *H04W 52/028* (2013.01); *H04B 7/0857* (2013.01); *H04W 52/0245* (2013.01); *H04B 7/0871* (2013.01); *H04L 25/06* (2013.01)

(58) Field of Classification Search
USPC .................. 375/316, 259, 260, 267, 347, 349
See application file for complete search history.

(56) References Cited

U.S. PATENT DOCUMENTS 5,852,630 A * 12/1998 Langberg et al. ............. 375/219
7,907,629 B2 3/2011 Sawai 2005/0208897 A1 9/2005 Lyons et al.
2007/0232344 A1 * 10/2007 Aoki et al. .................... 455/522
2009/0197549 A1 8/2009 Ben-Ayun et al.
(Continued)

FOREIGN PATENT DOCUMENTS

WO WO-2005043796 A2 5/2005
WO WO-2006102294 A2 9/2006
(Continued)

OTHER PUBLICATIONS

Hamidouche et al., "Impact of Realistic MIMO Physical Layer on Video Transmission Over Mobile Ad Hoc Network," IEEE 20th International Symposium on Personal, Indoor and Mobile Radio Communications (PIMRC 2009), Sep. 13, 2009, pp. 187-191, IEEE, Piscataway, NJ.

(Continued)

*Primary Examiner* — Siu Lee
(74) *Attorney, Agent, or Firm* — Holland & Hart LLP

(57) ABSTRACT

A single receive chain of a MIMO receiver is activated during a low power listen mode. Upon detecting a legacy short training field (L-STF) in a received packet, the single receive chain performs a first frequency estimation, and activates one or more additional receive chains of the MIMO receiver. The MIMO receiver uses maximal ratio combining (MRC) to receive the signal using the first receive chain and the one or more additional activated receive chains, wherein the MRC is based, at least in part, on the first frequency estimation. The MIMO receiver may determine whether the received packet is a high throughput/very high throughput (HT/VHT) packet, and if not, deactivate the one or more additional receive chains. In one alternative, the additional receive chains are not activated until determining that a HT/VHT packet has been received.

9 Claims, 6 Drawing Sheets

(56) References Cited

U.S. PATENT DOCUMENTS

| | | | |
|---|---|---|---|
| 2009/0304128 A1* | 12/2009 | Izumi et al. | 375/343 |
| 2010/0091911 A1 | 4/2010 | Sawai et al. | |
| 2010/0107042 A1 | 4/2010 | Sawai et al. | |
| 2011/0280168 A1 | 11/2011 | Lee et al. | |
| 2011/0280232 A1 | 11/2011 | Wu et al. | |
| 2012/0182980 A1 | 7/2012 | Abraham et al. | |
| 2012/0189085 A1* | 7/2012 | Shi | 375/346 |
| 2012/0207140 A1 | 8/2012 | Yu et al. | |
| 2013/0107995 A1* | 5/2013 | Husted | 375/345 |
| 2013/0142115 A1* | 6/2013 | Yu et al. | 370/328 |
| 2014/0071996 A1* | 3/2014 | Tetzlaff et al. | 370/474 |

FOREIGN PATENT DOCUMENTS

| | | | |
|---|---|---|---|
| WO | WO-2008071600 A1 | 6/2008 | |
| WO | WO-2012161722 A1 | 11/2012 | |

OTHER PUBLICATIONS

Xia et al., "Open-Loop Link Adaptation for Next-Generation IEEE 802.11n Wireless Networks," IEE Transactions on Vehicular Technology, Sep. 1, 2009, pp. 3713-3725, vol. 58, No. 7, IEEE Service Center, Piscataway, NJ.

ISA/EPO, Partial International Search Report of the International Searching Authority, Int'l App. No. PCT/US2014/020119, May 9, 2014, European Patent Office, Rijswijk, NL 8 pgs.

ISA/EPO, International Search Report and Written Opinion of the International Searching Authority, Int'l App. No. PCT/US2014/020119, Jul. 4, 2014, European Patent Office, Rijswijk, NL 23 pgs.

* cited by examiner

METHOD AND APPARATUS FOR SWITCHING BETWEEN LOW-POWER, SINGLE-CHAIN LISTEN AND MULTIPLE-CHAIN DEMODULATION

BACKGROUND

1. Field of the Invention

The present disclosure relates generally to wireless communications, and more particularly to a method and apparatus for achieving power savings in a multiple-input multiple-output (MIMO) wireless receiver.

2. Related Art

In order to address the issue of increasing bandwidth requirements demanded for wireless communications systems, different schemes have been developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards, including the Institute of Electrical and Electronics Engineers (IEEE) 802.11 standard.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. The MIMO system can provide improved performance (e.g., higher throughput and/or greater reliability) using the additional dimensionalities created by the multiple transmit and receive antennas.

MIMO technology is used to improve both the throughput and the range of a WLAN system. However, such improvement comes with a cost of increased power requirements. Use of a multiple-chain radio transceiver increases the power consumption of a WLAN system for both transmit and receive modes. Moreover, transmissions can occur at any time, so a MIMO receiver must be prepared to receive (i.e., be listening for transmissions) at any time. In addition, a MIMO receiver must listen to the associated channel before allowing its corresponding MIMO transmitter to transmit. Maintaining all of the receiver chains of a multiple-chain transceiver in listen mode undesirably results in significant power consumption.

The IEEE 802.11n specification defines some power saving techniques for a MIMO system. However, these techniques suffer from several limitations. Thus, a MIMO station may use a single receive chain for a predetermined time period, thereby reducing power consumption of the MIMO station. However, the MIMO station must first notify an associated access point (AP) that the MIMO station is entering the single receive chain mode for the predetermined time period, thereby undesirably requiring involvement of the AP. Moreover, while the MIMO receiver is operating in the single receive chain mode, the MIMO receiver will use a single receive chain during both the listen mode and during an active receive (demodulation) mode. As a result, a MIMO receiver operating in the single receive chain mode will exhibit rate vs. range (RvR) performance loss, because gain associated with maximal ratio combining (MRC) is lost during the active receive mode. Note that the gain associated with MRC is only provided when signals from multiple receive chains are combined. In addition, the MIMO station is not able to support multi-stream (i.e., Ns greater than or equal to two)) transmit/receive operations while operating the single receive chain mode.

It would therefore be desirable to have a method and apparatus for overcoming the above-described problems. More specifically, it would be desirable to have a method and apparatus for reducing power consumption in a MIMO receiver that does not require the involvement of an associated AP, and does not result in (or reduces the chance of) loss of MIMO range and throughput benefits.

SUMMARY

Accordingly, the present disclosure describes a MIMO receiver that only enables a single receiver chain during a listen (search) mode, and subsequently enables multiple receiver chains to participate in maximal ratio combining (MRC) or other multi-chain combining processing during a corresponding receive (demodulation) mode. This advantageously reduces power consumption of the MIMO receiver during the listen mode.

In accordance with one embodiment, a low power listen mode is implemented by enabling a single receive chain of a MIMO receiver to listen for a signal, while the other receive chains of the MIMO receiver are maintained in a reduced power (sleep) mode. When the single active receive chain detects a legacy short training field (L-STF) of an incoming packet, first frequency estimations are made for the single active receive chain, thereby resulting in a first frequency estimate. One or more additional receive chains of the MIMO receiver are activated during the first frequency estimations, and these additional activated receive chains are allowed to settle. In one embodiment, the first frequency estimate is applied to each of the additional activated receive chains.

In another embodiment, second frequency estimations are made for each of the additional activated receive chains of the MIMO receiver, thereby resulting in second frequency estimates. These second frequency estimates are combined with the first frequency estimate to provide a combined frequency estimate, which is used by all of the activated receive chains. By the time a legacy long training field (L-LTF) is subsequently received, signals provided by all the activated receive chains are combined using maximal ratio combining (MRC) or another multi-chain combining process to facilitate demodulation of the remainder of the received packet.

If the MIMO receiver is subject to DC offsets in the received signal, then first DC offset estimations may be performed by the single active receive chain upon detecting the L-STF, thereby providing a first DC offset estimate for the single active receive chain. After the additional receive chains have been activated and have settled, second DC offset estimates are performed by each of the additional activated receive chains, thereby providing second DC offset estimates for the additional active receive chains. In some embodiments, the MIMO receiver may use other techniques (for example, use a notch filter) to avoid DC offset estimation and compensation process.

In accordance with another embodiment, a single receive chain of a MIMO receiver is activated to listen for a signal, while the other receive chains of the MIMO receiver are maintained in a low power (sleep) state. When the single active receive chain detects a legacy short training field (L-STF) of an incoming packet, first frequency estimations are made for the single active receive chain, thereby resulting in a first frequency estimate. If the MIMO receiver is subject to DC offsets in the received signal, then the single active receive chain also performs first DC offset estimations upon detecting the L-STF, thereby providing a first DC offset estimate, which is applied to the single active receive chain. One or more additional receive chains of the MIMO receiver are also activated in response to detecting the L-STF, and these additional activated receive chains are allowed to settle. If the received packet is subsequently determined to not be a HT/VHT packet, then the additional activated receive chains are de-activated, and the packet is received with the single active receive chain. However, if the received packet is subsequently determined to be a HT/VTH packet, then the additional activated receive chains use the first frequency estimate, and (if the MIMO receiver is subject to DC offsets) perform second DC offset estimations, thereby providing second DC offset estimates, which are applied to the additional active receive chains. The receive signals provided by all the activated receive chains are then combined using maximal ratio combining (MRC) or another multi-chain combining process to facilitate demodulation of the remainder of the received packet.

In another embodiment, a single receive chain of a MIMO receiver is activated to listen for a signal, while the other receive chains of the MIMO receiver are maintained in a low power (sleep) state. When the single active receive chain detects a legacy short training field (L-STF) of an incoming packet, first frequency estimations are made for the single active receive chain, thereby resulting in a first frequency estimate. If the MIMO receiver is subject to DC offsets in the received signal, then the single active receive chain also performs first DC offset estimations upon detecting the L-STF, thereby providing a first DC offset estimate, which is applied to the single active receive chain. If the received packet is subsequently determined to not be a HT/VHT packet, then the packet is received with the single active receive chain (and additional receive chains are not activated). However, if the received packet is subsequently determined to be a HT/VTH packet, then one or more additional receive chains of the MIMO receiver are activated, and these additional activated receive chains are allowed to settle. These additional activated receive chains use the first frequency estimate, and (if the MIMO receiver is subject to DC offsets) perform second DC offset estimations, thereby providing second DC offset estimates, which are applied to the additional active receive chains. The signals provided by all the activated receive chains are then combined using maximal ratio combining (MRC) or another multi-chain combining process to facilitate demodulation of the remainder of the received packet.

In yet another embodiment, the above-described single receiver chain listen modes are enabled in response to detecting that a received signal strength indication (RSSI) exceeds a predetermined threshold.

The present invention will be more fully understood in view of the following description and drawings.

DETAILED DESCRIPTION OF THE DRAWINGS

Figure 1:
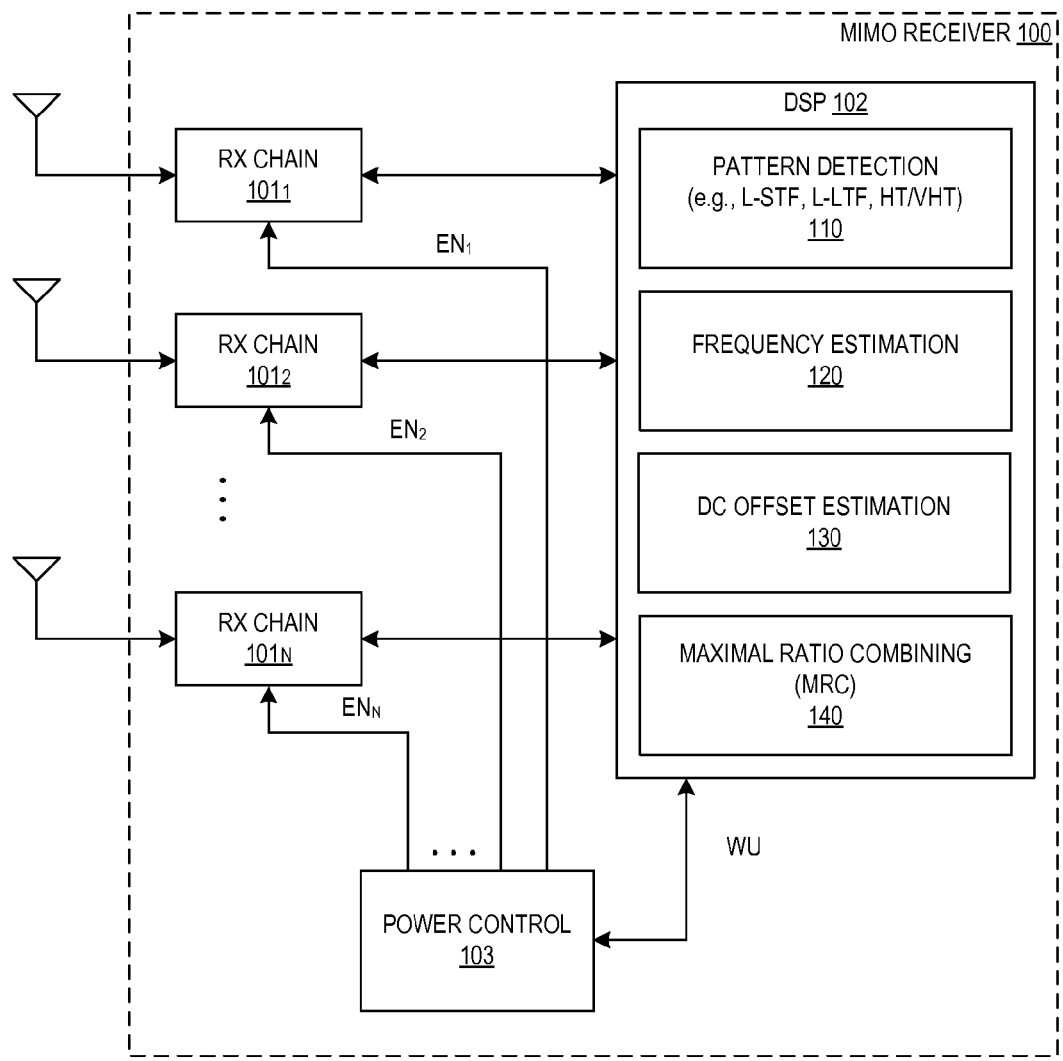
FIG. 1 is a block diagram of a multiple-input multiple-output (MIMO) wireless communication receiver in accordance with one embodiment.

In general, the present disclosure describes a MIMO receiver that uses only a single receiver chain during a listen mode (e.g., during automatic gain control (AGC) search operations), and subsequently enables multiple receiver chains during a corresponding receive (demodulation) mode. This advantageously reduces power consumption of the MIMO receiver during the listen mode. This reduction in power consumption can be significant during light to medium traffic conditions, wherein the associated MIMO station is not allowed to enter network sleep mode, and must remain in the listen mode for a long time.

In a particular embodiment, a MIMO receiver uses a single active receive chain to listen for signals, while other receive chains of the MIMO receiver remain in a low power mode (e.g., sleep mode). When the single active receive chain detects a predetermined set of symbols of a received packet (e.g., the symbols of a legacy short training field (L-STF)), the single active receive chain performs first frequency estimation in response to these detected symbols. If necessary (e.g., in MIMO receivers that do not include a DC notch filter to eliminate DC offset) the single active receive chain also performs a DC offset estimation in response to these detected symbols.

As soon as the single active receive chain detects the predetermined set of symbols, the other receive chains of the MIMO receiver are activated (i.e., transition from low power mode to a normal operating power) and are allowed to settle. These additional activated receive chains may use the first frequency estimation performed by the single active receive chain. Alternately, these additional active receive chains may perform second frequency estimations, which are combined with the first frequency estimation, thereby providing a combined frequency estimation that is used by all of the activated receive chains. If necessary, the additional activated receive chains also perform DC offset estimations in response to the received symbols.

Once the above-described frequency estimations and DC offset estimations are complete, signals provided by all of the activated receive chains are combined to implement maximal ratio combining (MRC) or another multi-chain combining process, whereby subsequently received signals are demodulated with increased gain. In various embodiments, the frequency estimations and DC offset estimations are completed, and multi-chain combining process is enabled by the time a legacy long training field (L-LTF) of the received packet is received. The advantages of such a method of operation include: significant power is saved during the listen mode, a robust switchover from a single receive chain to a greater number of active receive chains is enabled, and the benefits of MRC demodulation are achieved, without special needs being placed upon a system access point (AP).

In another embodiment, the one or more additional activated receive chains of the MIMO receiver are allowed to settle until it is determined whether the received packet is a HT/VHT packet. If the received packet is not be a HT/VHT packet, then the additional activated receive chains are deactivated, and the packet is received with the single active receive chain. However, if the received packet is a HT/VHT packet, then the additional activated receive chains use the first frequency estimate, and (if the MIMO receiver is subject to DC offsets) perform second DC offset estimations. Once the above-described frequency estimations and DC offset estimations are complete, signals provided by all of the activated receive chains are combined to implement maximal ratio combining (MRC) or another multi-chain combining process, whereby subsequently received signals are demodulated with increased gain. In various embodiments, the frequency estimations and DC offset estimations are completed, and multi-chain combining process is enabled by the time a HT/VHT long training field (HT/VHT-LTF) of the received packet is received.

In another embodiment, one or more additional receive chains of the MIMO receiver are not activated in response to detecting the legacy short training field, L-STF. Rather, the single activated receive chain operates in the manner described above, and it is determined whether the received packet is a HT/VHT packet. If the received packet is not a HT/VHT packet, then the packet is received with the single active receive chain (and additional receive chains are not activated). However, if the received packet is a HT/VTH packet, then one or more additional receive chains of the MIMO receiver are activated, and these additional activated receive chains are allowed to settle. These additional activated receive chains use the first frequency estimate, and (if the MIMO receiver is subject to DC offsets) perform second DC offset estimations, thereby providing second DC offset estimates, which are applied to the additional active receive chains. Once the above-described frequency estimations and DC offset estimations are complete, signals provided by all of the activated receive chains are combined to implement maximal ratio combining (MRC) or another multi-chain combining process, whereby subsequently received signals are demodulated with increased gain. In various embodiments, the frequency estimations and DC offset estimations are completed, and multi-chain combining process is enabled by the time a HT/VHT long training field (HT/VHT-LTF) of the received packet is received.

In yet another embodiment, the above-described listen modes are only enabled in response to detecting that a received signal strength indication (RSSI) exceeds a predetermined threshold.

The various embodiments summarized above will now be described in more detail.

FIG. 1 is a block diagram of a multiple-input multiple-output (MIMO) wireless receiver 100 in accordance with one embodiment of the present disclosure. The MIMO receiver 100 includes multiple receive chains $101_1$-$101_N$, digital signal processor (DSP) 102, and power control circuitry 103. MIMO receiver 100 includes N receive chains, where N is a positive integer. The outputs of receive chains $101_1$-$101_N$ are coupled to DSP 102.

Power control module 103 operates in response to signals/instructions provided by DSP 102, wherein power control logic 103 controls a power level/operating mode of each of the receive chains $101_1$-$101_N$. More specifically, power control module 103 provides enable signals $EN_1$-$EN_N$ to receive chains $101_1$-$101_N$, respectively. Power control module 103 activates the enable signals $EN_1$-$EN_N$ to activate the corresponding receive chains $101_1$-$101_N$ (e.g., enable the corresponding receive chains $101_1$-$101_N$ to operate in a normal power mode). Conversely, power control module 103 deactivates the enable signals $EN_1$-$EN_N$ to cause the corresponding receive chains $101_1$-$101_N$ to operate in a low power (sleep) mode. As described in more detail below, when MIMO receiver 100 is in a listen mode, the enable signal $EN_1$ is activated, such that corresponding receive chain $101_1$ is activated, and the enable signals $EN_2$-$EN_N$ are deactivated, such that corresponding receive chains $101_2$-$101_N$ are in sleep mode.

DSP 102 includes pattern detection logic 110, frequency estimation logic 120, DC offset estimation logic 130 and maximal ratio combining (MRC) logic 140. These elements 110, 120, 130 and 140 can be implemented by hardware, software and/or firmware in various embodiments of the present invention. The operation of the various elements of DSP 102 is described in more detail below.

Figure 2:
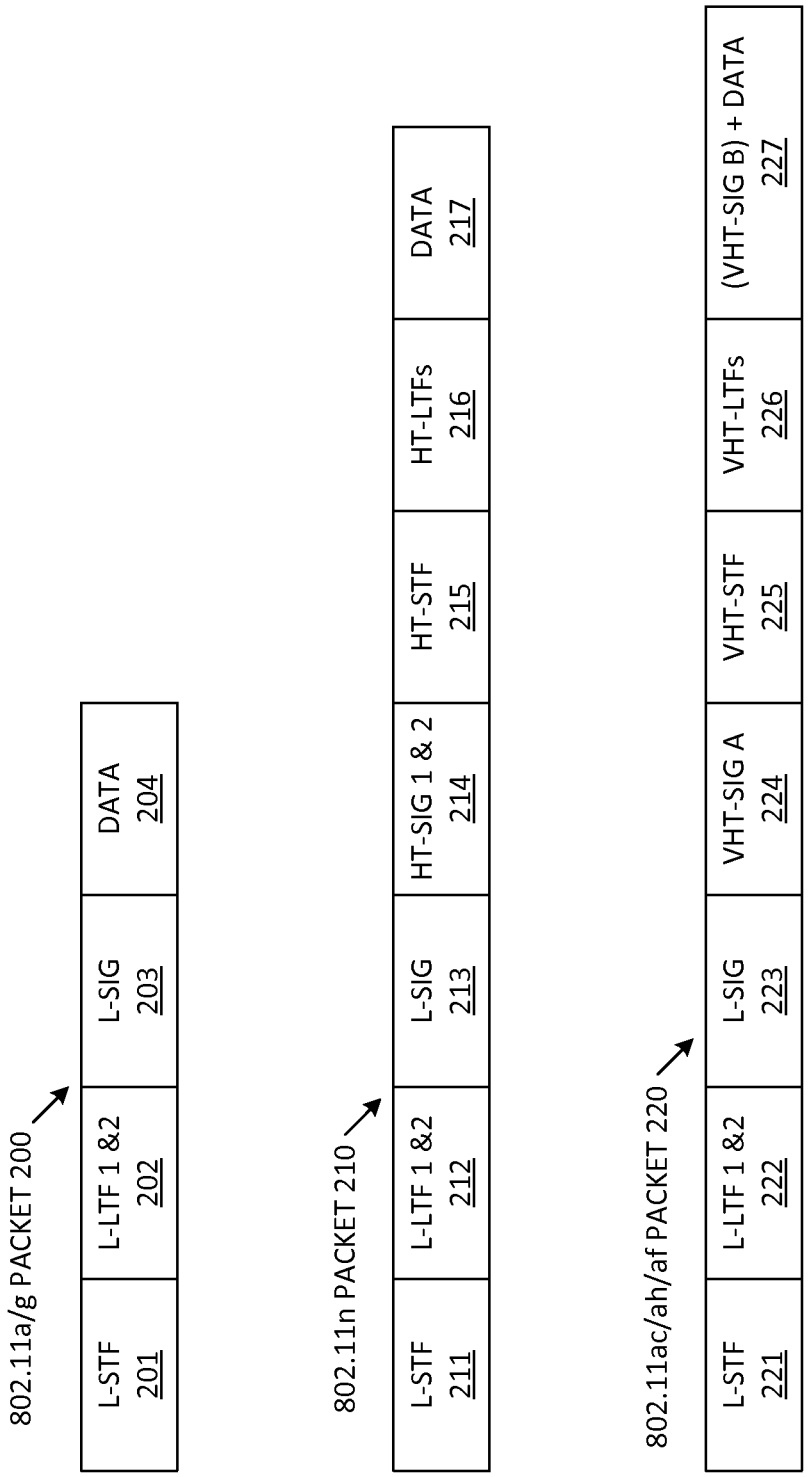
FIG. 2 is a block diagram illustrating the format of a legacy packet in accordance with an IEEE 802.11a/g standard, a high-throughput (HT) packet in accordance with an IEEE 802.11n standard, and a very high-throughput (VHT) packet in accordance with an IEEE 802.11ac, 802.11af, or 802.11ah standard, as used in accordance with one embodiment.

FIG. 2 is a block diagram that illustrates formats of various packets in accordance with an IEEE 802.11 standard, which can be received by MIMO receiver 100 in accordance with various embodiments of the present disclosure. More specifically, FIG. 2 illustrates the format of a legacy packet 200 in accordance with an IEEE 802.11a/g standard, a high-throughput (HT) packet 210 in accordance with an IEEE 802.11n standard, and a very high-throughput (VHT) packet 220 in accordance with an IEEE 802.11ac, 802.11af or 802.11ah standard. Any of these packets 200, 210 and/or 220 may be received by MIMO receiver 100 in accordance with various embodiments of the present disclosure.

Legacy packet 200 includes legacy short training field (L-STF) 201, legacy long training field (L-LTF 1&2) 202 and legacy signal field (L-SIG) 203, which collectively form the preamble of packet 200. Packet 200 also includes a data field 204.

HT packet 210 includes L-STF field 211, L-LTF 1&2 field 212, L-SIG field 213, high-throughput signal field (HT-SIG 1&2) 214, high-throughput short training field (HT-STF) 215 and high-throughput long training fields (HT-LTFs) 216 which collectively form the preamble of packet 210. Packet 210 also includes a data field 217. Fields 214, 215 and 216 are generically referred to herein as HT fields.

VHT packet 220 includes L-STF field 221, L-LTF 1&2 field 222, L-SIG field 223, very high-throughput signal field (VHT-SIG A) 224, very high-throughput short training field (VHT-STF) 225 and very high-throughput long training fields (VHT-LTFs) 226 which collectively form the preamble of packet 220. Packet 220 also includes a data field 227. Fields 224, 225 and 226 are generically referred to herein as VHT fields.

Figure 3:
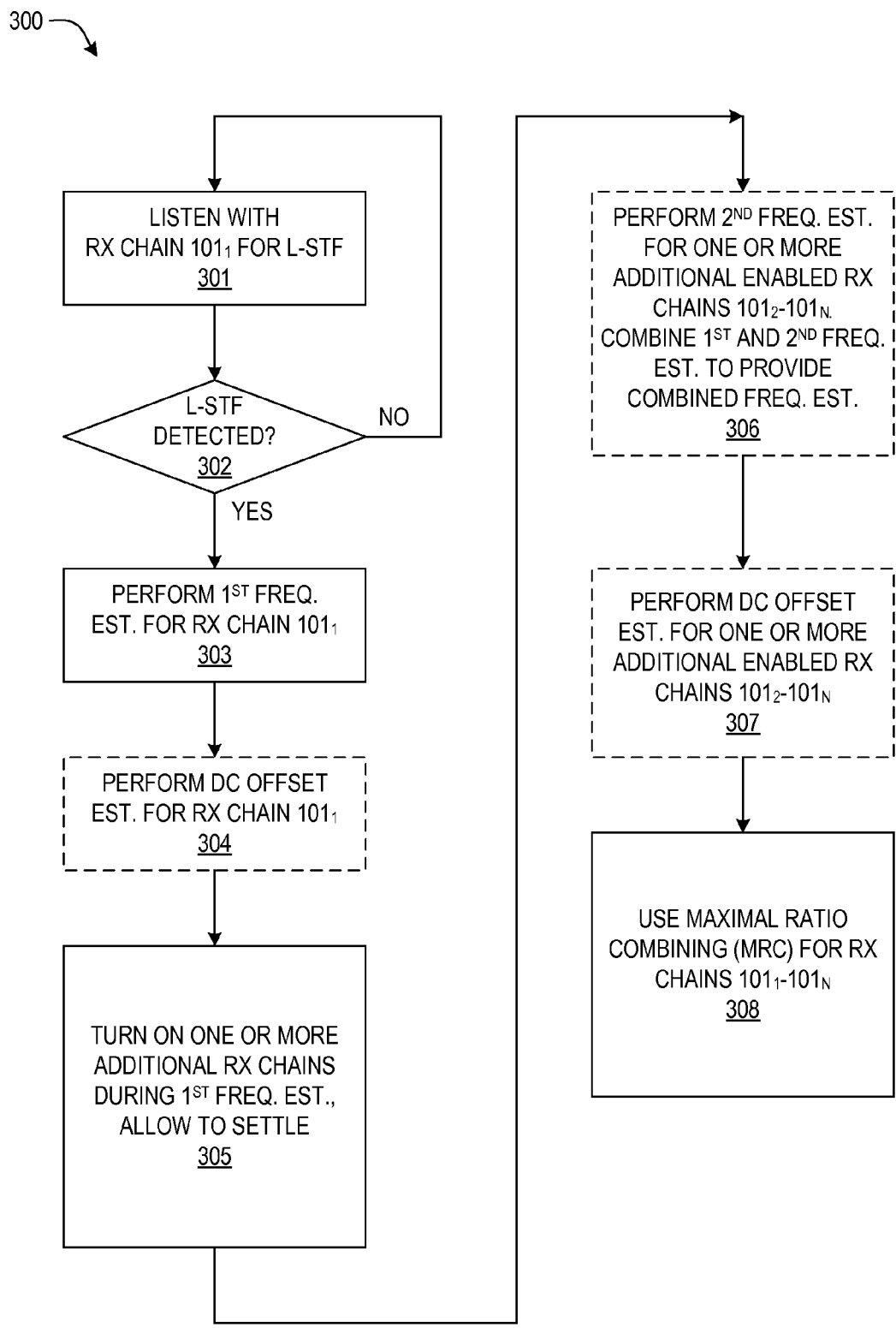
FIG. 3 is a flow diagram illustrating a method for receiving signals, such as packets having the formats defined by FIG. 2, with the MIMO receiver of FIG. 1, in accordance with one embodiment.

FIG. 3 is a flow diagram 300 illustrating a method for receiving signals, such as packets having the formats defined by FIG. 2, with MIMO receiver 100, in accordance with one embodiment of the present invention. Initially, MIMO receiver 100 is in a listen mode (or AGC search mode), wherein power control logic 103 enables receive chain $101_1$ (by activating $EN_1$), and places receive chains $101_2$-$101_N$ in sleep mode (by deactivating $EN_2$-$EN_N$) (301). While in this listen mode, pattern detection logic 110 within DSP 102 monitors the signals received by receive chain $101_1$ to determine whether symbols of a legacy short training field L-STF (e.g., L-STF 201 of packet 200, L-STF 211 of packet 210, or L-STF 221 of packet 220) are received by receive chain $101_1$ (302).

If a legacy short training field L-STF is not detected (302, No branch), then processing returns to 301, and MIMO receiver 100 advantageously remains in the low power listen mode.

If a legacy short training field L-STF is detected (302, No branch), then frequency estimation logic 120 begins performing a first frequency estimation in response to the symbols of the legacy short training field L-STF received by receive chain $101_1$ (303). In one embodiment, the first frequency estimation may be implemented by one or more coarse estimations followed by one or more fine estimations. As a result, frequency estimation logic 120 provides a first frequency estimate in response to the symbols of the L-STF received by receive chain $101_1$.

In addition, DC offset estimation logic 130 performs a DC offset estimation (also known as an AGC search) in response to the symbols of the legacy short training field L-STF received by receive chain $101_1$ (304). As a result, DC offset estimation logic 130 provides a first DC offset estimate in response to the symbols of the L-STF received by receive chain $101_1$. Note that if MIMO receiver 100 included a DC notch filter, which eliminates DC offset, then DC offset estimation logic 130 would not be required.

Upon determining that the legacy short training field L-STF has been detected by pattern detection logic 110, DSP 102 informs power control logic 103 that MIMO receiver 100 should transition from the listen mode to an active receive mode (e.g., by transmitting a wakeup signal WU to power control logic 103). In response, power control logic 103 activates one or more of the sleeping receive chains $101_2$-$101_N$ by activating the corresponding signals $EN_1$-$EN_N$ (305). In a particular embodiment, power control logic 103 activates all of the sleeping receive chains $101_2$-$101_N$ in response to the wakeup signal WU. Note that although 305 follows 303 and 304 in FIG. 3, it is understood that all three of these elements 303, 304 and 305 are initiated substantially simultaneously in response to detecting the legacy short training field L-STF.

The enabled receive chains $101_2$-$101_N$ are allowed to settle while the first frequency estimate is determined during 303 and the first DC offset estimate is determined during 304 (305).

After the newly activated receive chains $101_2$-$101_N$ are settled, these receive chains $101_2$-$110_N$ may use the first frequency estimate determined by receive chain $101_1$ during step 303. Alternately, these activated receive chains $101_2$-$101_N$ may perform second frequency estimations in response to symbols of the legacy short training field L-STF, thereby providing a set of second frequency estimates (306). These second frequency estimates are combined with the first frequency estimate to provide a combined frequency estimate, which is used by all of the activated receive chains $101_1$-$101_N$ (306). If the activated receive chains $101_2$-$101_N$ are subject to DC offset, DC offset estimation logic 130 performs second DC offset estimations in response to symbols of the legacy short training field L-STF received by the enabled receive chains $101_1$-$101_N$ (307). As a result, DC offset estimation logic 130 provides second DC offset estimates for each of the enabled receive chains $101_1$-$101_N$. Again, if MIMO receiver 100 includes a DC notch filter to eliminate DC offset, then 307 would not need to be performed.

By the time the symbols of a legacy long training field L-LTF (e.g., L-LTF 202 of packet 200, L-LTF 212 of packet 210, or L-LTF 222 of packet 220) are received (e.g., during L-LTF processing), DSP 102 enables maximal ratio combining (MRC) logic 140 (309), thereby allowing MIMO receiver 100 to perform full demodulation using all of the enabled receive chains $101_1$-$101_N$. That is, the enabled MRC logic 140 combines the signals received by each of the receive chains $101_1$-$101_N$, wherein each of the receive chains $101_1$-$101_N$ uses the first frequency estimate determined during 303 or the combined frequency estimate determined during 306, and corresponding DC offset estimates determined during 304 and 307. As a result, the legacy long training field L-LTF and the remainder of the received packet are advantageously demodulated with the high gain associated with a maximal ratio combining process. Thus, processing with multiple receive chains continues if HT-SIG or VHT-SIG fields are subsequently received.

Figure 4:
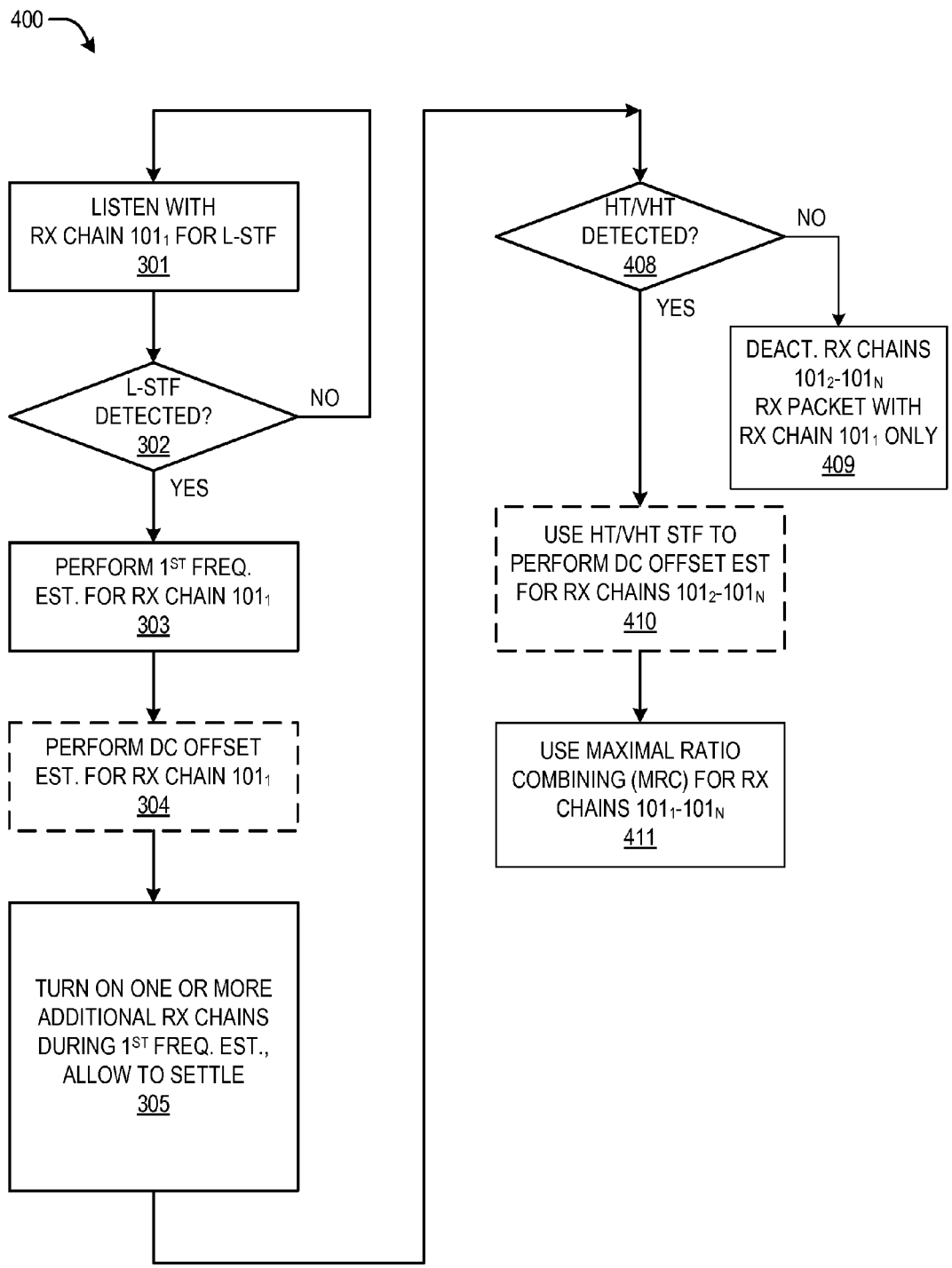
FIG. 4 is a flow diagram illustrating a method for receiving signals, such as packets having the formats defined by FIG. 2, with the MIMO receiver of FIG. 1, in accordance with another embodiment.

FIG. 4 is a flow diagram 400 illustrating a method for receiving signals, such as packets having the formats defined by FIG. 2, with MIMO receiver 100, in accordance with an alternate embodiment of the present invention. Because the method of FIG. 4 is similar to the method of FIG. 3, similar elements in FIGS. 3 and 4 are labeled with similar reference numbers. Thus, the method of FIG. 4 includes element 301-305, which have been described above in connection with FIG. 3.

In the embodiment of FIG. 4, the time required for receive chains $101_2$-$101_N$ to wake up and settle is too long to allow these receive chains $101_2$-$101_N$ to implement MRC by the time the legacy long training field L-LTF is received. In this case, the additional receive chains $101_2$-$101_N$ are activated during 305 in the manner described above. However, these additional receive chains $101_2$-$101_N$ are only used to implement MRC if the received packet is a HT or VHT packet (e.g., if an HT-SIG field or a VHT-SIG field is detected).

In 408, pattern detection logic 110 monitors the signals received by receive chains $101_1$-$101_N$ to determine whether a high-throughput (HT) field (e.g., HT-SIG 1&2 field 214, HT-STF 215 or HT-LTFs 216 of packet 210) or a very high-throughput (VHT) field (e.g., VHT-SIG A 224, VHT-STF 225 or VHT-LTFs 226 of packet 220) is received. If neither an HT field nor a VHT field is detected (408, No branch), receive chains $101_2$-$101_N$ are de-activated (return to sleep mode), and MIMO receiver 100 continues to receive the packet with receive chain $101_1$ in a single receive chain mode (409).

However, if a HT field or a VHT field is detected by pattern detection logic 110 (408, Yes branch), then the activated receive chains $101_2$-$110_N$ use the first frequency estimate determined by receive chain $101_1$ during step 303. If the activated receive chains $101_2$-$101_N$ are subject to DC offset, DC offset estimation logic 130 performs second DC offset estimations in response to symbols of the received HT/VHT short training field (e.g., HT-STF 215 of HT packet 210 or VHT-STF 225 of VHT packet 220) received by the enabled receive chains $101_1$-$101_N$ (410). As a result, DC offset estimation logic 130 provides DC offset estimates for each of the enabled receive chains $101_1$-$101_N$. Again, if MIMO receiver 100 includes a DC notch filter to eliminate DC offset, then 410 would not need to be performed.

DSP 102 enables maximal ratio combining (MRC) logic 140 (411), thereby allowing MIMO receiver 100 to perform full demodulation using all of the enabled receive chains $101_1$-$101_N$. That is, the enabled MRC logic 140 combines the signals received by each of the receive chains $101_1$-$101_N$, wherein each of the receive chains $101_1$-$101_N$ uses the first frequency estimate determined during 303, and corresponding DC offset estimates determined during 304 and 410. As a result, the HT/VHT long training field LTF (e.g., HT-LTFs 216 of packet 210 or VHT-LTFs 226 of packet 220) and the remainder of the received packet are advantageously demodulated with the high gain associated with a maximal ratio combining process.

Note that the method of FIG. 4 advantageously allows additional time (e.g., the duration of the legacy long training field L-LTF and legacy signal field L-SIG) for the receive chains $101_2$-$101_N$ to wake up and settle. In addition, the method of FIG. 4 only enables MRC logic 140 in response to detecting a HT packet or a VHT packet (e.g., packets 210 and 220).

Figure 5:
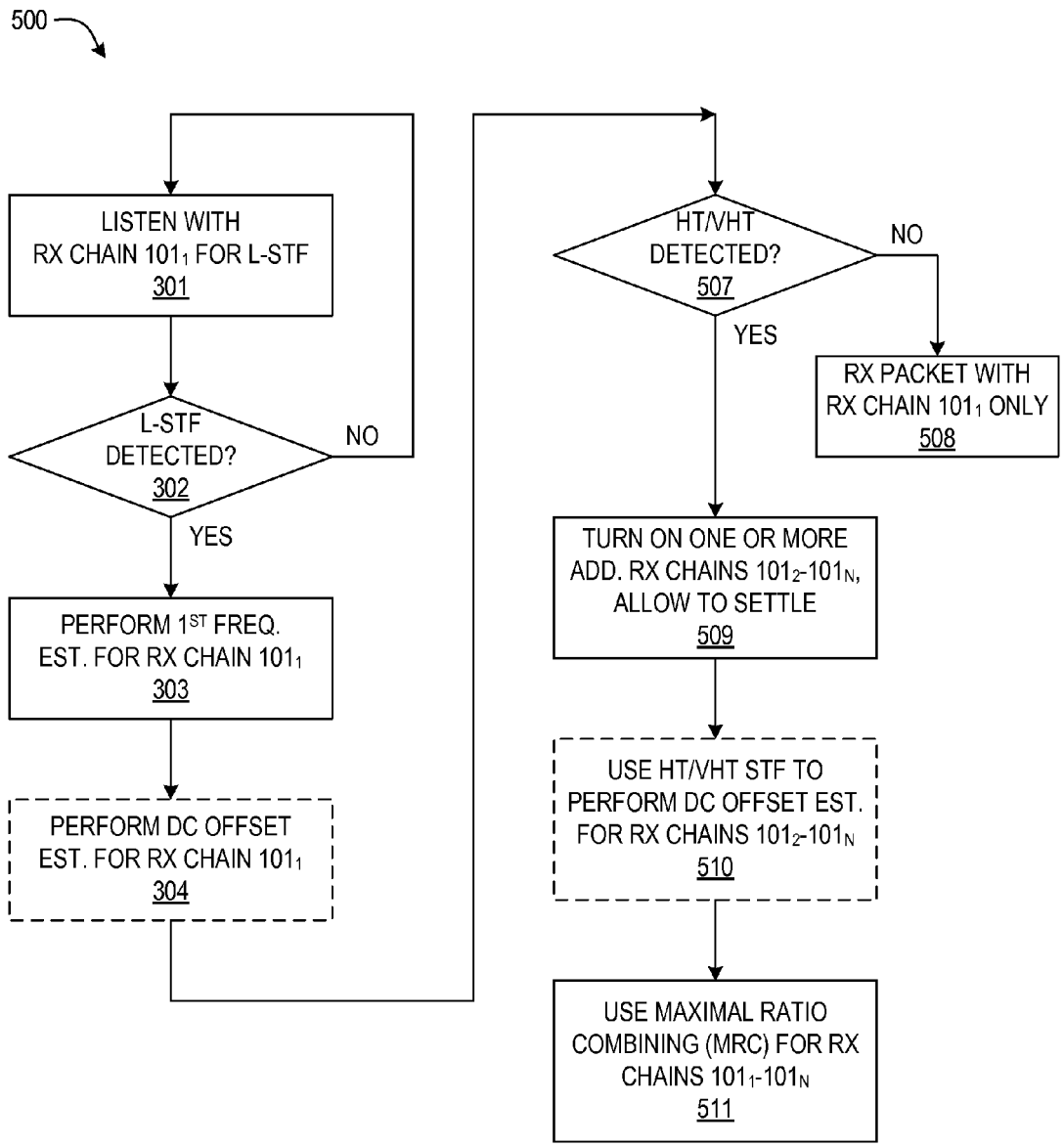
FIG. 5 is a flow diagram illustrating a method for receiving signals, such as packets having the formats defined by FIG. 2, with the MIMO receiver of FIG. 1, in accordance with yet another embodiment.

FIG. 5 is a flow diagram 500 illustrating a method for receiving signals, such as packets having the formats defined by FIG. 2, with MIMO receiver 100, in accordance with yet another embodiment of the present invention. As illustrated by FIG. 5, 301-304, which have been described above in connection with FIG. 3, are initially performed. After listening for symbols of the legacy short training field L-STF with the single activated receive chain $101_1$ (301), detecting the L-STF with the single activated receive chain $101_1$ (302), performing first frequency estimations for single activated receive chain $101_1$ (303) and any necessary first DC offset estimations for the single activated receive chain $101_1$ (304), pattern detection logic 110 monitors the symbols received by the single activated receive chain $101_1$ to determine whether the received packet is an HT/VHT packet (507) (e.g., determines whether HT-SIG field 214 or VHT-SIG field 224 is detected). Note that unlike the methods illustrated by FIGS. 3 and 4, the method of FIG. 5 does not activate the other receive chains $101_2$-$101_N$ in response to detecting the legacy short training field (L-STF).

If neither an HT field nor a VHT field is detected (507, No branch), then MIMO receiver 101 continues to receive the packet with receive chain $101_1$ in a single receive chain mode (508).

However, if an HT field or a VHT field is detected by pattern detection logic 110 (507, Yes branch), then DSP 102 informs power control logic 103 that MIMO receiver 100 should transition from the listen mode to an active receive mode (e.g., by transmitting a wakeup signal WU to power control logic 103). In response, power control logic 103 activates one or more of the sleeping receive chains $101_2$-$101_N$ by activating the corresponding signals $EN_1$-$EN_N$ (509). In a particular embodiment, power control logic 103 activates all of the sleeping receive chains $101_2$-$101_N$ in response to the wakeup signal WU. The newly activated receive chains $101_2$-$101_N$ are allowed to settle, and the first frequency estimate (determined in 303) is applied to each of the newly activated receive chains $101_2$-$101_N$, and are used to receive the incoming packet (509).

If the activated receive chains $101_2$-$101_N$ are subject to DC offset, DC offset estimation logic 130 performs second DC offset estimations in response to symbols of the received HT/VHT short training field (e.g., HT-STF 215 of HT packet 210 or VHT-STF 225 of VHT packet 220) received by the enabled receive chains $101_1$-$101_N$ (510). As a result, DC offset estimation logic 130 provides DC offset estimates for each of the enabled receive chains $101_1$-$101_N$. Again, if MIMO receiver 100 includes a DC notch filter to eliminate DC offset, then 510 would not need to be performed.

DSP 102 enables maximal ratio combining (MRC) logic 140 (511), thereby allowing MIMO receiver 100 to perform full demodulation using all of the enabled receive chains $101_1$-$101_N$. That is, the enabled MRC logic 140 combines the signals received by each of the receive chains $101_1$-$101_N$, wherein each of the receive chains $101_1$-$101_N$ uses the first frequency estimate determined during 303, and corresponding DC offset estimates determined during 304 and 510. As a result, the HT/VHT long training field LTF (e.g., HT-LTFs 216 of packet 210 or VHT-LTFs 226 of packet 220) and the remainder of the received packet are advantageously demodulated with the high gain associated with a maximal ratio combining process.

Note that the method of FIG. 5 may result in additional power savings because the additional receive chains $101_2$-$101_N$ are only activated after detecting an HT field or a VTH field of a received packet.

Figure 6:
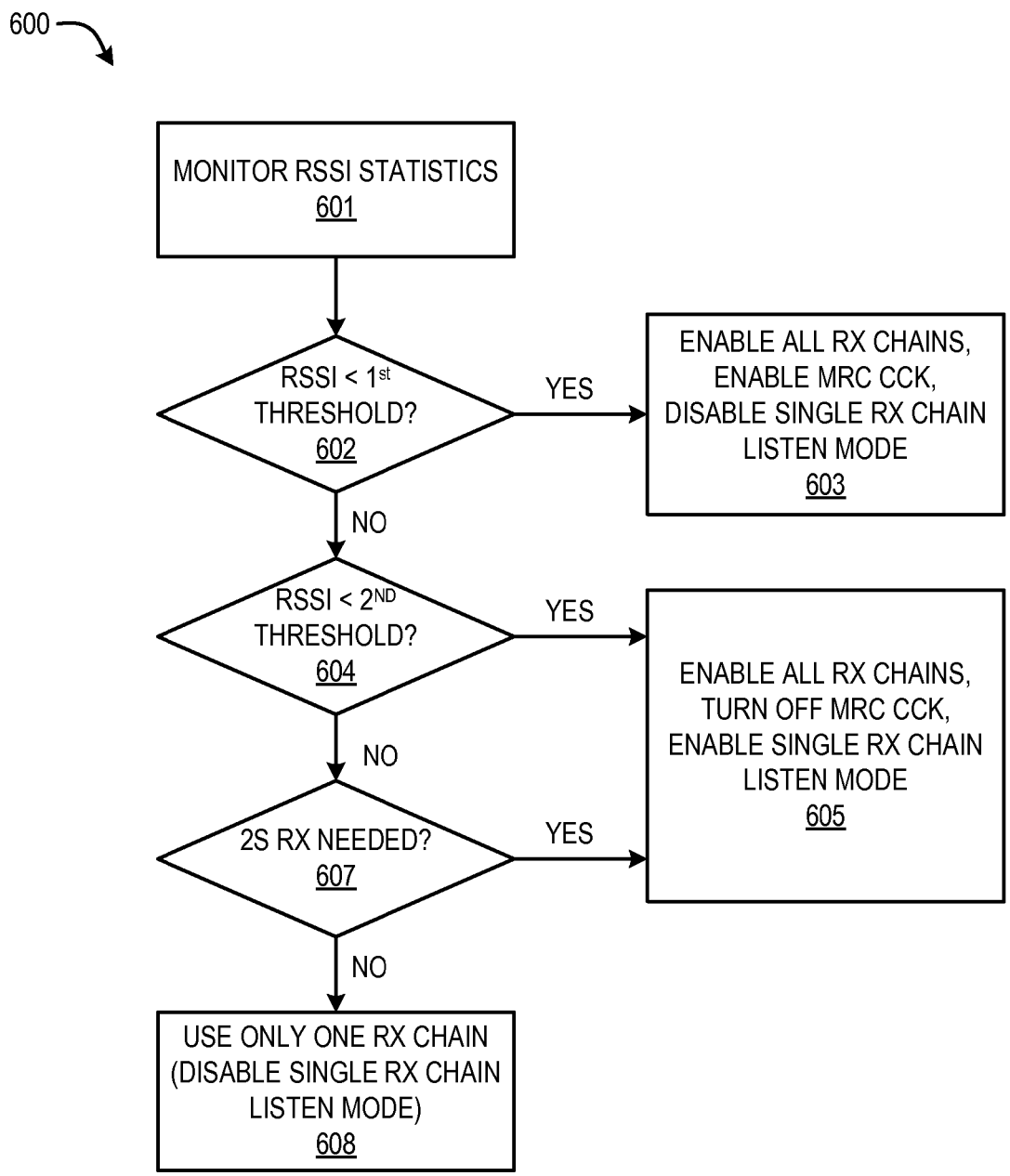
FIG. 6 is a flow diagram that illustrates a method of software monitoring of a received signal strength indicator (RSSI) level for disabling a single receive chain listen mode in the presence of a weak receive signal in accordance with another embodiment.

FIG. 6 is a flow diagram 600 that illustrates a method for determining whether to enable the single receive chain listen modes described above in connection with FIGS. 1-5 in response to received signal strength indicator (RSSI) statistics maintained by software within MIMO receiver 100. In this embodiment, system software (e.g., software implemented by DSP 102) monitors RSSI statistics to determine an RSSI level associated with a signal received by MIMO receiver 100 (601). A first determination is made as to whether the RSSI level is below a first predetermined level (e.g., less than −85 dBm) (602). If the detected RSSI level is below the first predetermined level (602, Yes branch), then all of the receive chains $101_1$-$101_N$ of the MIMO receiver 100 are activated, MRC direct sequence spread spectrum (DSSS)/complementary key coding (CCK) is enabled within MRC logic 140, and the single receive chain listen modes described above are disabled (603).

If the detected RSSI level is not below the first predetermined level (602, No branch), then a second determination is made as to whether the detected RSSI level is below a second predetermined level (e.g., less than −60 dBm) (604). If the detected RSSI level is below the second predetermined level (604, Yes branch), then all of the receive chains $101_1$-$101_N$ of the MIMO receiver 100 are activated, MRC DSSS/CCK is turned off within MRC logic 140 (because DSSS/CCK is not necessary in view of the relatively high RSSI level), and the single receive chain listen modes described above are enabled (605).

If the detected RSSI level is not below the second predetermined level (604, No branch), then a determination is made as to whether MIMO receiver 100 is required to perform multi-stream (2S) receive operations (607). If MIMO receiver 100 is required to perform multi-stream receive operations (607, Yes branch), then all of the receive chains $101_1$-$101_N$ of the MIMO receiver 100 are activated, MRC DSSS/CCK is turned off within MRC logic 140, and the single receive chain listen modes described above are enabled (605).

However, if MIMO receiver 100 is not required to perform multi-stream receive operations (607, No branch), then only one of the receive chains (e.g., receive chain $101_1$) of the MIMO receiver 100 is activated (608), and the single receive chain listen modes described above are disabled (because the other receive chains will not be activated in these conditions).

Although the embodiments described above indicate that a single receive chain (e.g., receive chain $101_1$) is initially activated, and the remaining receive chains (e.g., receive chains $101_2$-$101_N$) are initially deactivated during listen mode, it is understood that in other embodiments, more than one receive chain may be initially activated during listen mode. In general, N receive chains are initially activated during listen mode, and M receive chains are activated during receive mode, wherein M is greater than N. For example, two receive chains $101_1$-$101_2$ could be activated during listen mode, and all receive chains $101_1$-$101_N$ could be activated during receive mode. It is further understood that power savings would decrease as the number of receive chains activated during listen mode increases.

Moreover, although the embodiments described above implement maximal receive combining (MRC), it is understood that other multi-stream combining processes could be implemented instead of MRC in other embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method of providing a low power search mode for signals using a receiver including a plurality of receive chains, the method comprising:
    listening for a signal with a first receive chain of the plurality of receive chains;
    when a legacy short training field (L-STF) is detected by the first receive chain, performing a first frequency estimation for the first receive chain;
    activating one or more additional receive chains of the plurality of receive chains upon detecting the L-STF;
    determining whether the signal corresponds with a high throughput (HT) or very high throughput (VHT) packet; and
    upon determining the signal corresponds with a HT or VHT packet, performing respective DC offset estimations for the one or more additional receive chains and using maximal ratio combining (MRC) to receive the signal using the first receive chain and the one or more additional receive chains, the MRC based, at least in part, on results of the first frequency estimation for the first receive chain.

2. The method of claim 1, further comprising deactivating the one or more additional receive chains upon determining the signal does not correspond with a HT or VHT packet.

3. The method of claim 1, further comprising maintaining each of the one or more additional receive chains in a low power state while listening for a signal with the first receive chain.

4. The method of claim 1, further comprising applying results of the first frequency estimation to the one or more additional receive chains.

5. The method of claim 1, further comprising performing a respective DC offset estimation for the first receive chain in response to detecting the L-STF.

6. A multiple-input multiple-output (MIMO) receiver providing a low power search mode for signals, and including a plurality of receive chains, the receiver comprising:
- a first receive chain configured to listen for a signal during a listen mode of the receiver;
- means for performing a first frequency estimation for the first receive chain when a legacy short training field (L-STF) is detected by the first receive chain;
- means for activating one or more additional receive chains of the plurality of receive chains upon detecting the L-STF by the first receive chain;
- means for determining whether the signal corresponds with a high throughput (HT) or very high throughput (VHT) packet; and
- means for performing respective DC offset estimations for the one or more additional receive chains and using maximal ratio combining (MRC) to receive the signal using the first receive chain and the one or more additional receive chains, upon determining the signal corresponds with a HT or VHT packet.

7. The receiver of claim 6 further comprising means for deactivating the one or more additional receive chains upon determining the signal does not correspond with a HT or VHT packet.

8. The receiver of claim 6, further comprising means for maintaining each of the one or more additional receive chains in a low power state while listening for a signal with the first receive chain.

9. A non-transitory, computer-readable medium storing computer-executable instructions that when executed on a computer perform a process of:
- listening for a signal with a first receive chain of a plurality of receive chains;
- when a legacy short training field (L-STF) is detected by the first receive chain, performing a first frequency estimation for the first receive chain;
- activating one or more additional receive chains of the plurality of receive chains upon detecting the L-STF;
- determining whether the signal corresponds with a high throughput (HT) or very high throughput (VHT) packet; and
- upon determining the signal corresponds with a HT or VHT packet, performing respective DC offset estimations for the one or more additional receive chains and using maximal ratio combining (MRC) to receive the signal using the first receive chain and the one or more additional receive chains, the MRC based, at least in part, on results of the first frequency estimation for the first receive chain.

\* \* \* \* \*